(12) United States Patent
Kim et al.

(10) Patent No.: US 7,514,182 B2
(45) Date of Patent: Apr. 7, 2009

(54) ORGANIC ELECTROLYTIC SOLUTION AND LITHIUM BATTERY USING THE SAME

(75) Inventors: Han-Su Kim, Seoul (KR); Jin-Sung Kim, Cheonan-si (KR); Myung-Dong Cho, Hwaseong-si (KR); Hyo-Sug Lee, Suwon-si (KR); Dong-Min Im, Gwacheon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 533 days.

(21) Appl. No.: 11/048,727

(22) Filed: Feb. 3, 2005

(65) Prior Publication Data

US 2005/0170257 A1 Aug. 4, 2005

(30) Foreign Application Priority Data

Feb. 4, 2004 (KR) ...................... 10-2004-0007229

(51) Int. Cl.
*H01M 6/16* (2006.01)
(52) U.S. Cl. .................. 429/329; 429/326; 429/330; 429/332; 252/62.2
(58) Field of Classification Search .................. 429/326, 429/329, 330, 332; 252/62.2
See application file for complete search history.

(56) References Cited

U.S. PATENT DOCUMENTS

| 6,048,637 | A | 4/2000 | Tsukahara et al. |
| 6,232,021 | B1 | 5/2001 | Negoro |
| 6,291,107 | B1 | 9/2001 | Shimizu |
| 2003/0190529 | A1 | 10/2003 | Kim et al. |

FOREIGN PATENT DOCUMENTS

| JP | 06-333596 | | 12/1994 |
| JP | 07-078634 | | 3/1995 |
| JP | 7-176323 | | 7/1995 |
| JP | 07-192761 | * | 7/1995 |
| JP | 7-320779 | | 12/1995 |
| JP | 08022840 | * | 1/1996 |
| JP | 8-064238 | | 3/1996 |
| JP | 08-321312 | | 12/1996 |
| JP | 2000-040524 | | 2/2000 |
| JP | 2000-091162 | | 3/2000 |
| JP | 2000-331709 | | 11/2000 |
| JP | 2002-008717 | | 1/2002 |
| JP | 2002-313418 | | 10/2002 |
| JP | 2003-132947 | | 5/2003 |
| JP | 2003-132948 | | 5/2003 |
| KR | 10-2002-0041645 | * | 6/2002 |

OTHER PUBLICATIONS

European Search Report dated Feb. 12, 2007.
C.R. Yang, et al., "Composition Analysis of the Passive Film on the Carbon Electrode of a Lithium-Ion Battery with an EC-Based Electrolyte", Journal of Power Sources, vol. 72, 1998, p. 66-70.
S. Megahed, et al., "Lithium-Ion Rechargeable Batteries", Journal of Power Sources, vol. 51, 1994, p. 79-104.

* cited by examiner

*Primary Examiner*—Laura S Weiner
(74) *Attorney, Agent, or Firm*—H.C. Park & Associates, PLC

(57) ABSTRACT

An organic electrolytic solution and a rechargeable lithium battery comprising the same is provided. The organic electrolytic solution contains a lithium salt and an organic solvent mixture. The organic solvent mixture is comprised of a solvent with high permittivity, a solvent with a low boiling point, and a cyclic organic compound having at least an oxy-carbonyl group and having a ring structure of 6 units or more. The organic electrolytic solution helps to increase reduction decomposition stability in the lithium battery using the same. As a result, the irreversible capacity of the lithium battery at a first cycle decreases and charge/discharge efficiency and lifespan of the lithium battery increases. In addition, the battery thickness is maintained within a specific range at room temperature after formation and standard charging, which improves the reliability of the lithium battery.

8 Claims, No Drawings

ORGANIC ELECTROLYTIC SOLUTION AND LITHIUM BATTERY USING THE SAME

BACKGROUND OF THE INVENTION

This application claims the priority of Korean Patent Application No. 2004-7229, filed on Feb. 4, 2004, in the Korean Intellectual Property Office, the disclosure of which is incorporated herein in its entirety by reference.

FIELD OF THE INVENTION

The present invention relates to an organic electrolytic solution capable of maintaining a battery thickness within a specific range in order to obtain high reliability and a lithium battery using the organic electrolytic solution.

DESCRIPTION OF THE RELATED ART

With the requirements for light, high performance, portable electronic devices such as video cameras, mobile phones and laptop computers, much research has been conducted on batteries used as their power sources. For example, rechargeable lithium batteries have three times the energy density per unit weight as conventional lead storage batteries, nickel-cadmium batteries, nickel-hydro batteries and nickel-zinc batteries, and can be recharged rapidly. Due to these advantages, lithium batteries are of major interest to researchers.

In lithium-ion batteries, the cathode active material is composed of a transition-metal compound or a lithium-containing transition metal oxide. Examples of the transition-metal compound include, but are not limited to $LiNiO_2$, $LiCoO_2$, $LiMn_2O_4$, $LiFePO_4$, $LiNi_xCo_{1-x}O_2$ (x=1 or 2), $Ni_{1-x-y}Co_xM-n_yO_2$ ($0 \leq x \leq 0.5$ and $0 \leq y \leq 0.5$), and the like. An anode active material is composed of a lithium metal, a lithium metal alloy, carbon materials, graphite materials, or the like.

Electrolytes can be classified into two categories, liquid and solid electrolytes. Safety concerns associated with liquid electrolytes include fires caused by the leakage of the liquid electrolyte and the ruin of batteries due to evaporation of the liquid electrolyte.

To solve these problems, the use of solid electrolytes instead of liquid electrolytes has been suggested. In general, solid electrolytes are unlikely to leak and are easily processed. Much research has focused on solid electrolytes, particularly on solid polymer electrolytes which are categorized into full solid and gel types. The difference between these two types is that the full solid-type electrolyte does not contain an organic electrolytic solution while a gel-type electrolyte does.

A conventional aqueous electrolytic solution is not usually suitable for the lithium battery because the lithium anode reacts vigorously with an aqueous electrolytic solution at high working voltages. For this reason, an organic electrolytic solution prepared by dissolving a lithium salt in an organic solvent is used in lithium batteries. The preferred organic solvent must have high ionic conductivity, high permittivity and low viscosity but it is very difficult to obtain a single solvent with all of these characteristics. As a result, a mixed solvent system composed of an organic solvent having high permittivity and a second organic solvent having high ionic conductivity, or a mixed solvent system composed of an organic solvent having high permittivity and a second organic solvent having low viscosity is used in lithium batteries.

On initial charging of lithium rechargeable batteries, the carbon in the anode reacts with the electrolytic solution to form a passivation layer, such as a solid electrolyte interface (SEI) layer on the anode. The SEI layer prevents further decomposition of the electrolytic solution and stabilizes charging/discharging (J. Power Sources, 51 (1994), 79-104). Further, the SEI layer acts as an ion channel, allowing only lithium ions to pass, and solvates lithium ions in order to inhibit organic solvents flowing along with the lithium ions from being cointercalated into the carbon anode. Due to this solvation of lithium ions, the anode structure can be protected.

However, during initial charging while the SEI layer is being formed, gas is also produced inside the battery, which causes swelling in the battery (J. Power Sources, 72 (1998), 66-70). In addition, after charging when the charged battery is placed at high temperatures, the electrochemical and thermal energy increase over time and cause a gradual collapse of the passivation layer, thus exposing the surface of the anode. As a result, more gas is produced and the pressure in the battery increases. This increased pressure in the battery results in a transformation of a central portion of the battery surface. For example, a rectangular battery and a lithium polymer battery swell in specific directions. Additionally, the increased pressure in the battery causes inconsistent adhesion between electrode plates which degrades the performance and safety of the battery and makes it difficult to have a simplified assembly.

A well-known method is to add an additive to the electrolytic solution to alter the SEI forming reaction. For example, Japanese Patent Laid-open publication No. 1996-321312 discloses adding N-butyl amines of 1-20% by volume of an electrolytic solution to extend a battery lifespan and to improve its storage ability. Japanese Patent Laid-open Publication No. 1996-64238 discloses adding a calcium salt of $3 \times 10^{-4}$-$3 \times 10^{-3}$ M to improve the battery storage ability. Japanese Patent Laid-open publication No. 1994-333596 discloses adding an azo compound to suppress reactions between an electrolytic solution and an anode to obtain improved storage ability of a battery. Japanese Patent Laid-open publication No. 1995-176323 discloses adding $CO_2$ to an electrolytic solution in order to form a Li rechargeable battery with excellent charge/discharge efficiency, discharge capacity, and charge/discharge cycle life. Japanese Patent Laid-open publication No. 1995-320779 discloses adding a sulfide-based compound to suppress decomposition of an electrolytic solution.

However, when as mentioned above, a trace amount of organic material or inorganic material is added to induce the formation of a proper thin film on the anode, the properties of the SEI layer formed on the anode surface may be altered depending on the solvent used as an electrolytic solution and the electrochemical characteristics of an additive. The SEI layers formed in the presence of the above-mentioned additives are chemically unstable, so the generation of gas caused by the decomposition of the electrolytic solution is not sufficiently suppressed.

U.S. Pat. No. 6,291,107 discloses an additive of a polymerizable organic compound such as methyl methacrylate, butyl acrylate, isoprene, or the like to form a polymerization film containing a vinyl group on the surface of the carbonaceous anode material to decrease the decomposition reaction of the electrolytic solution. However, the polymerization film formed on the anode material functions as a resistance in this case so that the impedance of the battery is increased. As a result, the battery capacity decreases and the battery performance deteriorates at low temperatures at high rates. Further, the thin film formed by the electric polymerization reaction of the polymerizable organic compound and the direction in which the thin film grows is not parallel to the electrode material surface. This causes the uniformity and density of the thin film to deteriorate which facilitates side reactions between the anode and the electrolytic solution.

SUMMARY OF THE INVENTION

The present invention provides an organic electrolytic solution capable of maintaining a battery thickness within a specific range in order to obtain higher reliability.

The present invention also provides a lithium battery using the organic electrolytic solution.

According to an aspect of the present invention, an organic electrolytic solution containing a lithium salt and an organic solvent mixture is provided. The organic solvent mixture is comprised of a solvent with high permittivity and a solvent with a low boiling point. The organic electrolytic solution further contains a cyclic organic compound, which has a ring structure of 6 or more units and has at least an oxycarbonyl group.

According to another aspect of the present invention, a lithium battery containing a cathode, anode, and the above-mentioned organic electrolytic solution is provided.

DETAILED DESCRIPTION OF THE INVENTION

The present invention relates to an organic electrolytic solution containing a lithium salt and an organic solvent mixture of a solvent with high permittivity and a solvent with a low boiling point. The organic electrolytic solution further includes a cyclic organic compound, which has a ring structure of 6 or more units and has at least an oxycarbonyl group.

The cyclic organic compound having a ring structure of 6 or more units and at least an oxycarbonyl group is ring-opened by electrochemical reduction on the anode surface and is simultaneously polymerized. Then the cyclic organic compound alters the solid electrolyte interface (SEI) formed on the anode surface. In particular, due to a C—O double bond in the resulting compound, it can strongly become attached to the anode. In addition, the resulting compound has a high density, which suppresses side reactions between a graphite surface and the electrolyte thus preventing battery swelling and enhancing battery reliability. In the cyclic organic compound according to the present embodiment, uni-monomers of 5 components or less are ring-opened and polymerized, and simultaneously coordinated with lithium ions. Further, the cyclic organic compound has a low degree of polymerization which lowers resistance. As a result, the cyclic organic compound has an adverse influence on battery performance.

Any compound having at least an oxycarbonyl group and which is also capable of electrochemical polymerization can be used in the present embodiment. Examples of the cyclic organic compound may include but are not limited to lactide, epsilon-caprolactone, diglycolic anhydride, [1,4]dioxane-2,5-dione, [1,3,5,7]tetroxonane-8,9-dione, and 2,2-dimethyl-1,2-dioxane-4,6 dione.

There should be an amount of cyclic organic compound in the range of 0.1-2% by weight, and preferably 0.25-1% by weight based on the total weight of the organic solvent mixture. If the amount of the cyclic organic compound is outside of the range listed above, the battery swells largely and charge/discharge characteristics of the battery deteriorate.

Any solvent with high permittivity that is commonly used in the art can be used in the present embodiment. For example, such solvents include but are not limited to cyclic carbonate or γ-butyrolactone. Examples of the cyclic carbonate include ethylene carbonate, propylene carbonate, and butylene carbonate.

Any solvent with a low boiling point that this commonly used in the art can be used in the present embodiment. For example, such solvents may include, but are not limited to a linear carbonate, dimethoxyethane, diethoxyethane, a fatty acid ester derivative, or the like. Examples of the linear carbonate include dimethyl carbonate, ethylmethyl carbonate, diethyl carbonate, and dipropyl carbonate.

The organic solvent mixture may be a solvent with high permittivity and a solvent with a low boiling point in a ratio of 1:1-1:9 by volume. If the ratio is outside of this range, the discharge capacity and charge/discharge cycle life of a battery is degraded.

Any lithium salt that is commonly used in lithium batteries may be used in the present embodiment. The lithium salt may include $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$, for example.

The lithium salt included in the organic electrolytic solution may have a concentration of 0.5-2 M. If the concentration is less than 0.5M, the conductivity of the electrolytic solution will be too low which results in a deterioration of electrolytic performance. If the concentration exceeds 2 M, the viscosity of the electrolytic solution increases and the mobility of lithium ions decreases.

Hereinafter, a lithium battery using an organic electrolytic solution which was described in an embodiment of the present invention and a method of fabricating the lithium battery will be described.

A lithium battery according to an embodiment of the present invention contains a cathode, anode, and an organic electrolytic solution according the present embodiment.

The present invention can be applied to any type of lithium battery. For example, the present invention relates to one-use lithium first batteries, and rechargeable lithium batteries such as lithium-ion and lithium-ion polymer batteries.

A method of fabricating a lithium battery according to an embodiment of the present invention will now be described.

First, a cathode active material, conductor, binder, and solvent are mixed to prepare a cathode active material composition. The cathode active material composition is directly coated on an aluminium current collector and then dried to prepare a cathode plate. Alternately, the cathode active material composition can be cast onto a separated support, detached from the separated support and laminated onto an aluminium current collector thereby preparing a cathode plate.

Any lithium-containing metal oxide that is commonly used in the art as the cathode active material can be used in the present embodiment. Examples of the lithium-containing metal oxide include but are not limited to $LiCoO_2$, $LiMn_xO_{2x}$, and $LiNi_{1-x}Mn_xO_{2x}$ (x=1 or 2), $Ni_{1-x-y}CO_xMn_yO_2$ ($0 \leq x \leq 0.5$ and $0 \leq y \leq 0.5$), and the like.

The conductor may be carbon black and the binder may be vinylidenefluoride/hexafluoropropylene copolymer, polyvinylidenefluoride, polyacrylonitirile, polymethylmethacrylate, polytetrafluoroethylene, a mixture thereof, or a styrene butadiene rubber-based polymer, for example. Examples of the solvent include N-methylpyrrolidone, acetone, and water. In the present embodiment, the amounts of the cathode active material, conductor, the binder, and solvent are the same as those used in conventional methods of fabrication of lithium batteries.

The process for fabricating an anode plate is the same as that for the cathode plate. An anode active material, conductor, a binder, and solvent are mixed to prepare an anode active material composition. A copper current collector is directly coated with the anode active material composition to form an anode plate. Alternately, the anode active material composition can be cast onto a separated support, detached from the separated support, and laminated on a copper current collector.

Examples of the anode active material may include but are not limited to lithium metal, lithium alloy, carbonaceous materials, and graphite. The anode active material composition includes the same conductor, binder and solvent as used in the manufacturing process for the cathode. If needed, a plasticizer which is used to form pores inside an electrode plate is added to the cathode active material composition or to the anode active material composition.

Any separator used commonly in lithium batteries can be used in the present embodiment. In particular, a separator must have low resistance to the movement of ions in an electrolyte and have an excellent electrolyte-retaining ability. Specific examples of the separator may include but are not limited to fiberglass, polyester, teflon, polyethylene, polypropylene, polytetrafluoroethylene (PTFE), and a combination thereof, which may be in a non-woven or woven fabric form. In particular, a separator composed of polyethylene, polypropylene or the like which can be rolled can be used for a lithium ion battery and a separator that can retain a large amount of an organic electrolytic solution may be used for a lithium-ion polymer battery. A method of manufacturing the separator will now be described.

A polymer resin, filler, and solvent are mixed to prepare a separator composition. Next, the separator composition is coated on the upper portion of the electrode, and then dried to form a separator film. Alternately, the separator composition can be cast onto a support, dried, detached from the support, and finally laminated on an upper portion of an electrode thereby preparing a separator film.

Any polymer resin that is commonly used for binders of electrode plates can be used in the present embodiment. Examples of the polymer resin may include but are not limited to vinylidenefluoride/hexafluoropropylene copolymer, polyvinylidenefluoride, polyacrylonitrile, polymethylmethacrylate, and a combination thereof. In particular, the polymer resin may be a vinylidenefluoride/hexafluoropropylene copolymer in which the amount of hexafluoropropylene is in the range of 8-25% by weight.

The separator is interposed between the cathode plate and the anode plate to form an electrode assembly. The electrode assembly is wound or folded and then placed in a cylindrical or rectangular battery case. The organic electrolytic solution according to an embodiment of the present invention is then injected into the battery case to form a lithium-ion battery.

Alternatively, the electrode assemblies may be stacked vertically on top of another to form a bi-cell structure, soaked in an organic electrolytic solution, and then sealed in a pouch to complete a lithium ion polymer battery.

The present invention will be described in greater detail with reference to the following examples. These examples are for illustrative purposes and are not intended to limit the scope of the invention.

EXAMPLE 1

Preparation of Electrolytic Solution 0.1% by weight of a cyclic organic compound such as lactide and a lithium salt such as 1M $LiPF_6$ as were added to an organic solvent mixture containing 30% by volume of ethylene carbonate, 10% by volume of propylene carbonate, and 60% by volume of ethylmethylcarbonate to form the organic electrolytic solution.

EXAMPLE 2

Preparation of Electrolytic Solution

An organic electrolytic solution was prepared in the same manner as in Example 1 except that the amount of the lactide was 1% by weight based on the total weight of the organic solvent mixture.

EXAMPLE 3

Preparation of Electrolytic Solution

An organic electrolytic solution was prepared in the same manner as in Example 1 except that the amount of lactide was 2% by weight based on the total weight of the organic solvent mixture.

EXAMPLE 4

Preparation of Electrolytic Solution

An organic electrolytic solution was prepared in the same manner as in Example 1 except that 0.1% by weight of epsilon caprolactone based on the total weight of the organic solvent mixture instead of lactide was used as a cyclic organic compound.

EXAMPLE 5

Preparation of Electrolytic Solution

An organic electrolytic solution was prepared in the same manner as in Example 4 except that the amount of epsilon caprolactone was 1% by weight based on the total weight of the organic solvent mixture.

EXAMPLE 6

Preparation of Electrolytic Solution

An organic electrolytic solution was prepared in the same manner as in Example 4 except that the amount of epsilon caprolactone was 2% by weight based on the total weight of the organic solvent mixture.

EXAMPLE 7

Preparation of Electrolytic Solution

An organic electrolytic solution was prepared in the same manner as in Example 1 except that 0.1% by weight of diglycolic anhydride based on the total weight of the organic solvent mixture instead of lactide was added as the cyclic organic compound.

EXAMPLE 8

Preparation of Electrolytic Solution

An organic electrolytic solution was prepared in the same manner as in Example 7 except that the amount of diglycolic anhydride was 1% by weight based on the total weight of the organic solvent mixture.

EXAMPLE 9

Preparation of Electrolytic Solution

An organic electrolytic solution was prepared in the same manner as in Example 7 except that the amount of diglycolic anhydride was 2% by weight based on the total weight of the organic solvent mixture.

EXAMPLE 10

Preparation of Electrolytic Solution

An organic electrolytic solution was prepared in the same manner as in Example 1 except that 0.1% by weight of [1,4] dioxane-2,5-dione based on the total weight of the organic solvent mixture instead of lactide was added as the cyclic organic compound.

EXAMPLE 11

Preparation of Electrolytic Solution

An organic electrolytic solution was prepared in the same manner as in Example 10 except that the amount of [1,4] dioxane-2,5-dione was 1% by weight based on the total weight of the organic solvent mixture.

EXAMPLE 12

Preparation of Electrolytic Solution

An organic electrolytic solution was prepared in the same manner as in Example 10 except that the amount of [1,4] dioxane-2,5-dione was 2% by weight based on the total weight of the organic solvent mixture.

EXAMPLE 13

Preparation of Electrolytic Solution

An organic electrolytic solution was prepared in the same manner as in Example 1 except that 0.1% by weight of [1,3,5,7]tetroxonane-8,9-dione instead of lactide was added as a cyclic organic compound.

EXAMPLE 14

Preparation of Electrolytic Solution

An organic electrolytic solution was prepared in the same manner as in Example 13 except that the amount of [1,3,5,7]tetroxonane-8,9-dione was 1% by weight of based on the total weight of the organic solvent mixture.

EXAMPLE 15

Preparation of Electrolytic Solution

An organic electrolytic solution was prepared in the same manner as in Example 13 except that the amount of [1,3,5,7]tetroxonane-8,9-dione was 2% by weight based on the total weight of the organic solvent mixture.

EXAMPLE 16

Preparation of Electrolytic Solution

An organic electrolytic solution was prepared in the same manner as in Example 1 except that 0.1% by weight of [2,2]-dimethyl-1,2-dioxane-4,6-dione instead of lactide was added as a cyclic organic compound.

EXAMPLE 17

Preparation of Electrolytic Solution

An organic electrolytic solution was prepared in the same manner as in Example 16 except that the amount of [2,2]-dimethyl-1,2-dioxane-4,6-dione was 1% by weight based on the total weight of the organic solvent mixture.

EXAMPLE 18

Preparation of Electrolytic Solution

An organic electrolytic solution was prepared in the same manner as in Example 16 except that the amount of [2,2]-dimethyl-1,2-dioxane-4,6-dione was 2% by weight based on the total weight of the organic solvent mixture.

Comparative Example 1

Preparation of Electrolytic Solution

1M $LiPF_6$ as a lithium salt was added to an organic solvent mixture of 30% by volume of ethylene carbonate, 10% by volume of propylene carbonate, and 60% by volume of ethylmethyl carbonate to prepare an organic electrolytic solution.

Comparative Example 2

Preparation of Electrolytic Solution 0.1% by weight of methyl methacrylate as a polymerizable organic compound and 1M $LiPF_6$ as a lithium salt were added to an organic solvent mixture of 30% by volume of ethylene carbonate, 10% by volume of propylene carbonate, and 60% by volume of ethylmethyl carbonate to prepare an organic electrolytic solution.

Comparative Example 3

Preparation of Electrolytic Solution

An organic electrolytic solution was prepared in the same manner as in Comparative Example 2 except that the amount of methyl methacrylate was 1% by weight based on the total weight of the organic solvent mixture.

Comparative Example 4

Preparation of Electrolytic Solution

An organic electrolytic solution was prepared in the same manner as in Comparative Example 2 except that the amount of methyl methacrylate was 2% by weight based on the total weight of the organic solvent mixture.

EXAMPLES 19-36

Fabrication of Lithium Batteries

A mixture of 95% by weight of $LiCoO_2$, 2% by weight of PVDF as a binder, and 3% by weight of a carbon conductor was prepared. 100 mL of N-methylpyrrolidone (NMP) and ceramic balls were added to the mixture. The resulting mixture was stirred in a 200 mL plastic bottle for 10 hours. The resulting product was cast on a 15 μm thick aluminium foil using a 250 μ/m-spaced doctor blade, dried in an oven at 110° C. for about 12 hours to completely remove the NMP, and roll-pressed to prepare a cathode having the thickness of 95 μm.

A mixture of 96% by weight of graphite-based powder, 4% by weight of PVDF as a binder, and 100 ml of NMP was prepared. The mixture was stirred for about 10 hours in the presence of ceramic balls. The result product was cast on a 19 μm thick copper foil using a 300 μm-spaced doctor blade, dried in an oven at 90° C. for about 10 hours to completely remove the NMP, and roll-pressed to prepare an anode having the thickness of 120 μm.

A 20 μm thick polyethylene/polypropylene micro multi-porous membrane (purchased from U.S. Hoechst Celanese Co.) was used as a separator.

The separator was interposed between electrodes prepared in the above-mentioned manner, roll-pressed to be placed in a rectangular can, and injected with the electrolytic solutions prepared in Examples 1-18 to form a rectangular battery.

Comparative Examples 5-8

Fabrication of Lithium Battery

Rectangular batteries were fabricated in the same manner as in Example 19 except that the organic electrolytic solutions prepared in Comparative Examples 1-4 were used.

EXPERIMENTAL EXAMPLE 1

Battery thickness change test after charging

Batteries fabricated in Examples 19-36 and Comparative Examples 5-8 were charged to 4.2V. A ratio of a battery thickness after charging to a battery thickness prior to charging was measured in micrometers. The results are shown in Table 1.

EXPERIMENTAL EXAMPLE 2

Battery Cycle Characteristics Test

Batteries fabricated in Examples 19-36 and Comparative Examples 5-8 were charged and discharged at 1C rate. A ratio of battery capacity at 100 cycles to an initial battery capacity was measured. The ratio represents a capacity maintenance rate. The results are shown in Table 1.

TABLE 1

|  | Thickness change rate after charging (%) | Capacity maintenance rate after 100 cycles (%) |
|---|---|---|
| Example 19 | 13.8 | 90.3 |
| Example 20 | 8.2 | 93.9 |
| Example 21 | 7.9 | 93.1 |
| Example 22 | 15.6 | 88.4 |
| Example 23 | 9.3 | 91.8 |
| Example 24 | 10.1 | 90.7 |
| Example 25 | 16.3 | 93.8 |
| Example 26 | 9.8 | 96.7 |
| Example 27 | 9.2 | 95.1 |
| Example 28 | 10.9 | 93.1 |
| Example 29 | 8.6 | 96.1 |
| Example 30 | 7.9 | 95.2 |
| Example 31 | 24.8 | 90.8 |
| Example 32 | 20.9 | 95.8 |
| Example 33 | 18.5 | 93.2 |
| Example 34 | 24.0 | 92.1 |
| Example 35 | 19.9 | 95.3 |
| Example 36 | 19.7 | 94.2 |
| Comparative Example 5 | 48.0 | 85.2 |
| Comparative Example 6 | 38.2 | 85.5 |
| Comparative Example 7 | 24.7 | 87.0 |
| Comparative Example 8 | 21.6 | 83.4 |

As shown in Table 1, in Comparative Examples 5-8 the thickness change rate (%) is 48% at a maximum and the cycle capacity maintenance rate (%) is about 80%. However, in a case where the electrolytic solution according to the embodiment of the present invention is used, the thickness change rate (%) is generally about 15%. Even in Example 31, the thickness change rate (%) does not exceed 25% and the capacity maintenance rate (%) is more than 90%. The data indicate that the present invention provides the electrolytic solution with a superior performance.

An electrolytic solution according to the present invention and a lithium battery using the same solution have improved reduction decomposition stability. As a result, the irreversible capacity of the lithium battery at a first cycle decreases and charge/discharge efficiency and lifespan of the lithium battery increases. In addition, the battery thickness is maintained within a specific range at room temperature after fabrication and standard charging which improves the reliability of the battery.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic electrolytic solution comprising a lithium salt; a mixture of organic solvents with high permittivity and a low boiling point; and a cyclic organic compound having a ring structure of 6 units or more and having at least an oxy-carbonyl group,
   wherein the cyclic organic compound is [1,3,5,7] tetroxo-nane-8,9-dione, and
   wherein the amount of the cyclic organic compound is in the range of 0.25-1% by weight based on the total weight of the organic solvent mixture.

2. The organic electrolytic solution of claim 1, wherein the lithium salt has a concentration of 0.5-2.0 M.

3. The organic electrolytic solution of claim 1, wherein the solvent with high permittivity is a compound selected from the group consisting of ethylene carbonate, propylene carbonate, butylene carbonate, and γ-butyrolactone.

4. The organic electrolytic solution of claim 1, wherein the solvent with a low boiling point is a compound selected from the group consisting of dimethyl carbonate, ethylmethyl carbonate, diethyl carbonate, dipropyl carbonate, dimethoxyethane, diethoxyethane, and a fatty acid ester derivative.

5. A lithium battery, comprising: a cathode; an anode; and the organic electrolytic solution according to claim 1.

6. The lithium battery of claim 5, wherein the lithium salt has a concentration of 0.5-2.0M.

7. The lithium battery of claim 5, wherein the solvent with high permittivity is a compound selected from the group consisting of ethylene carbonate, propylene carbonate, butylene carbonate, and γ-butyrolactone.

8. The lithium battery of claim 5, wherein the solvent with a low boiling point is a compound selected from the group consisting of dimethyl carbonate, ethylmethyl carbonate, diethyl carbonate, dipropyl carbonate, dimethoxyethane, diethoxyethane, and a fatty acid ester derivative.

* * * * *